Feb. 1, 1927.

F. L. HOLMAN 1,616,125

MOVABLE LIVE FISH CONTAINER

Filed Nov. 26, 1923

INVENTOR
FRANK L. HOLMAN
By Paul, Paul & Moore
ATTORNEYS

Patented Feb. 1, 1927.

1,616,125

UNITED STATES PATENT OFFICE.

FRANK L. HOLMAN, OF MINNEAPOLIS, MINNESOTA, ASSIGNOR TO M. F. PATTERSON DENTAL SUPPLY CO., OF ST. PAUL, MINNESOTA, A CORPORATION OF ILLINOIS.

MOVABLE LIVE-FISH CONTAINER.

Application filed November 26, 1923. Serial No. 676,998.

This invention relates to an improved live fish container which is freely movable or portable and is distinguished from those types of similar containers which are adapted to maintain a relatively stationary or fixed position so that fresh water may be constantly supplied to the container in order to aerate the water in order that the fish may live. During the transportation or movement of the fish within tank cars or in the common form of livebait pails, it is difficult and decidedly inconvenient to renew constantly the water within which the live fish are confined. An example of the difficulties to be overcome is afforded by the common form of fisherman's live-bait pail. The live-bait, such as a minnow, is placed within the pail and it is moved to the place of use. This movement may involve a long or short automobile trip or boat-ride and the use of the fish may extend over a period of several hours in more or less exposed places, afloat or ashore. The common result, well-known to all fishermen, is that a large majority of the fish are dead when it is desired to use them. This loss principally follows from the lack of renewal of the water in the pail or other container, and such disadvantage occurs equally as well in the case of the tank cars for the transportation of larger fish where the constant renewal of the water is not possible.

This novel invention provides means to be associated with such movable water containers which are adapted to contain live fish therein. Broadly, it consists in the combination therewith of means which are movable with the container to discharge the life-sustaining gas to the contained water and with means on the container or associated therewith which are readily movable with the container to supply gas to such discharger means.

The object therefore of this invention is to provide an improved movable live fish container.

Other objects of the invention will more fully appear from the following description and the accompanying drawings and will be pointed out in the annexed claims.

In the drawings, there has been disclosed a structure designed to carry out the objects of the invention but it is to be understood that the invention is not confined to the exact features shown as various changes may be made within the scope of the claims which follow.

Figure 1:
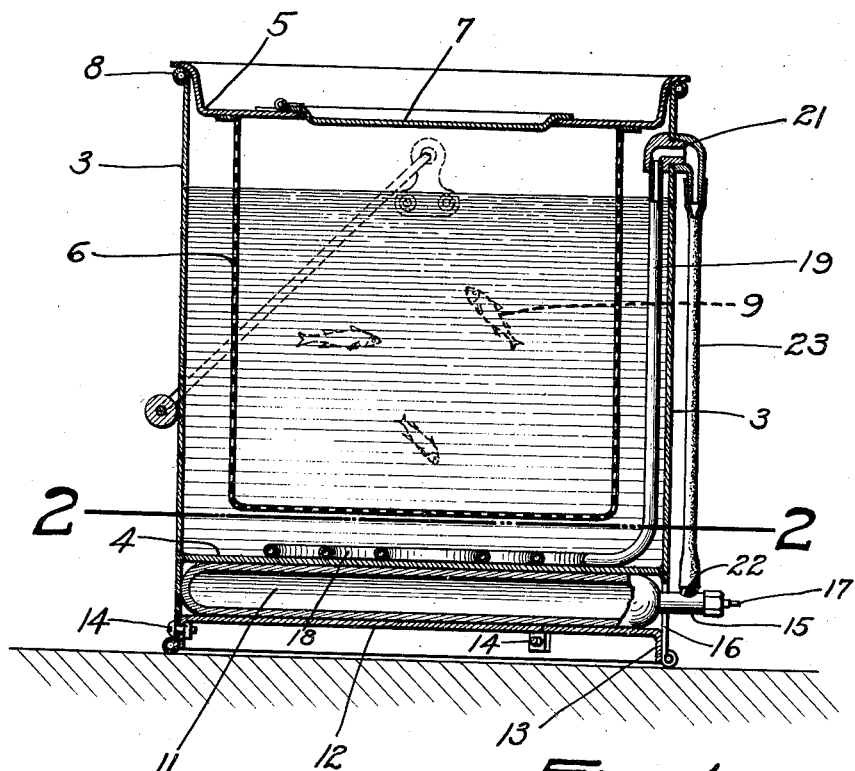
Figure 1 shows a vertical section through the novel container.
Figure 2:
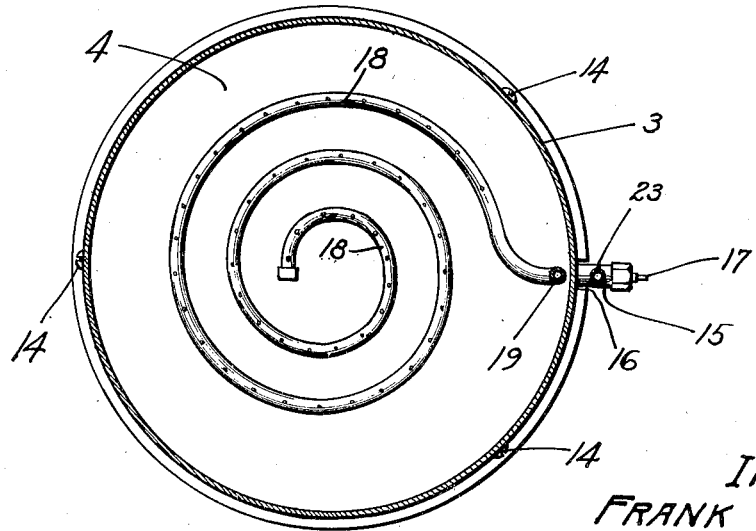
Figure 2 is a transverse sectional view on the line 2—2 of Figure 1 and shows the discharging coil.

In the selected embodiment of the invention here shown, the container consists of a sheet metal casing 3 which is preferably circular in form as is common in containers of this type or it may obviously be made of other shapes. The bottom 4 of the casing is preferably spaced above the lower end of the cylindrical casing. The cover 5 of the casing is of the usual form and has secured thereto a depending perforate element such as the usual screen 6. This cover 5 is preferably provided with an opening which may be closed by the hinged plate 7 mounted on the cover 5. The cover 5 is outwardly flared and is supported by the rolled upper ends 8 of the case. In use, the casing 3 is filled with water substantially to the level shown in the accompanying drawing and live fish 9 are adapted to be placed in the perforate element and confined therein within the water which may circulate through the perforate element from the surrounding parts of the casing.

It has been found with the use of live-bait pails of the old type that the fish quickly die because the water becomes vitiated. In this novel invention, means are provided for supplying a life-sustaining gas, such as oxygen, to the water within the container. A gas-discharging means is placed within the container and a connection is carried by the container so that this discharge pipe may be connected to a portable means for supplying this gas. A convenient means of carrying a supply of oxygen, for example, is by way of a tank 11 charged with this gas under pressure. In the present unitary structure, means are provided on the container for carrying such a gaseous supply. The tank 11 is preferably made in a shape corresponding to the interior periphery of the container and may be placed within the walls of the casing below the bottom thereof. As here shown, a base plate 12 is provided with a peripheral downwardly turned flange 13 which may be secured to the lower end of the case by any suitable means, such for example, as the bolts and nuts 14. The tank 11 has a valved neck 15 which may be inserted through a slot 16 longitudinally extending upwardly from the lower end of the casing as shown in Figure 1. This neck is preferably provided with a valve 17 by means of which the flow of gas under pressure from the tank 11 may be controlled.

The preferred form of gas-discharging means consists of a pipe, shaped to provide a coil 18 which may be placed in the water container on the adjacent inner face of the bottom thereof and below the lower end of the screen which terminates above the casing bottom. The coil 18 is provided with a plurality of orifices and with an integral pipe section 19 which upwardly extends for air-tight connection with a coupling member 21 carried by the casing and extending therethrough. A convenient means of connecting the outer end of the coupling member 21 and the outlet 22 of the gas tank is by means of a flexible connection or tubing 23.

It is to be noted that the coil is not provided with a direct short connection through the base to the removable gas-tank because the water would enter the discharge pipe and flow into the gas tank when the pressure in the gas-tank had fallen approximately to atmospheric pressure. This disadvantage is overcome by having a portion of the connection between the coil and gas tank at a higher elevation than the water level in the casing. The gas tank is demountable and gas under pressure may be inserted therefor from time to time as the gas is used up. The valve 17 affords a means for controlling at all times the rate of flow of gas from the tank to the discharge coil. As this has heretofore been practiced, it is preferred during transportation and use of this device to maintain constantly a small flow of gas to the casing interior. When not in use, the flow may be entirely shut off by means of the valve 17. It is preferred to use oxygen under pressure in these tanks and this gas may be easily obtained in this commercial form. It is to be understood that the gas tank may, however, be in the usual commercial form instead of the flat form here shown which corresponds peripherally to the shape of the casing.

Having thus described my invention what I claim as new and desire to secure by Letters-Patent, is:

1. In a two-part movable water container having an inner removable perforate chamber adapted to confine live fish therein, the combination of pipe section coiled about the bottom of the outer container and having a plurality of orifices for the discharge of a life-sustaining gas upwardly to said inner container, a tank of said gas carried by and below the outer container, and flexible connecting means between said pipe and tank carried by the container and adapted to supply gas to the coiled pipe.

2. In a movable water container adapted to confine live fish therein, the combination of a casing adapted to contain water, a cover therefor, a hollow perforate member suspended from the cover within the casing and adapted to contain the fish in water therein, and means movable with the container to supply a life-sustaining gas to the contained water, including a gas container housed at the bottom of the water container.

3. In a movable water container adapted to confine live fish therein, the combination of a casing adapted to contain water and having its walls extending below its bottom to form a chamber to receive a tank of life-sustaining gas, connections between the tank and the casing to discharge the gas to the fish-containing water, the tank being demountably received and connected to permit removal or replacement.

4. In a movable water container adapted to confine live fish therein, the combination of a casing adapted to contain water and having its walls extending below its bottom, a base plate adapted to be demountably connected to the walls and spaced from said casing bottom to receive a tank of life-sustaining gas, connections between the tank and the casing to discharge the gas to the fish-containing water, and said connections being disconnectible to permit removal or replacement of the tank.

5. A device of the class described providing removably nested outer and inner containers, large and small, respectively imperforate and perforate and intercommunicating, the inner container being removably sustained upon the rim of the outer, and said outer container having its wall extending below its bottom to form a chamber, and having a delivery pipe disposed at the inner side of the outer container extending beneath the inner container and being spirally formed beneath said inner container and of substantially the diameter of the bottom of said inner container, said pipe traversing and projecting beyond the outer container at its top, a valve controlled air bottle removably disposed within the bottom chamber of the outer container, said bottle having a projecting nipple, and a flexible conduit detachably secured to nipple and projecting pipe at the outer side of the outer container.

In witness whereof, I have hereunto set my hand this 23rd day of November 1923.

FRANK L. HOLMAN.